United States Patent
Becker et al.

[11] Patent Number: 6,135,221
[45] Date of Patent: Oct. 24, 2000

[54] DRIVE ASSEMBLY FOR TRACK-LAYING VEHICLE

[75] Inventors: Harald Becker, Oberhausen; Frank Tintrup, Herne; Gerhard Wagner, Wetter, all of Germany

[73] Assignee: Intertractor GmbH, Gevelsberg, Germany

[21] Appl. No.: 09/294,824

[22] Filed: Apr. 19, 1999

[30] Foreign Application Priority Data

Apr. 22, 1998 [DE] Germany .......................... 198 17 967

[51] Int. Cl.[7] .................................................. B62D 55/00
[52] U.S. Cl. .............................................................. 180/9.5
[58] Field of Search .............................. 180/9, 9.1, 9.5, 180/9.54, 9.52, 9.56; 305/143, 145, 146, 150

[56] References Cited

U.S. PATENT DOCUMENTS

| | | | |
|---|---|---|---|
| 5,515,935 | 5/1996 | Lagace | 180/9.1 |
| 6,027,185 | 2/2000 | Crabb | 305/148 |
| 6,047,785 | 4/2000 | Snyder et al. | 180/9.1 |

*Primary Examiner*—Kevin Hurley
*Assistant Examiner*—Kevin McKinley
*Attorney, Agent, or Firm*—Herbert Dubno; Andrew Wilford

[57] ABSTRACT

A drive assembly for a track-laying vehicle adapted to travel in a horizontal direction along the ground has a horizontally elongated frame having two opposite ends and upper and lower edges extending parallel to the direction between the ends, a drive wheel at one of the ends, a support fixed on the frame between the ends, and a guide on the frame extending between the fixed support and the other end along a line forming an acute angle with the direction and extending downward toward the other end. A movable support displaceable parallel to the line in the guide carries an idler wheel at the other end. A spring braced between the supports urges the idler wheel parallel to the line away from the drive wheel. A plurality of ground wheels are mounted along the lower edge between the drive and idler wheels and an endless track looped around the wheels extends parallel to the direction along the idler wheels. A drive connected to the drive wheel rotates the drive wheel and displaces the track around the wheels.

4 Claims, 3 Drawing Sheets

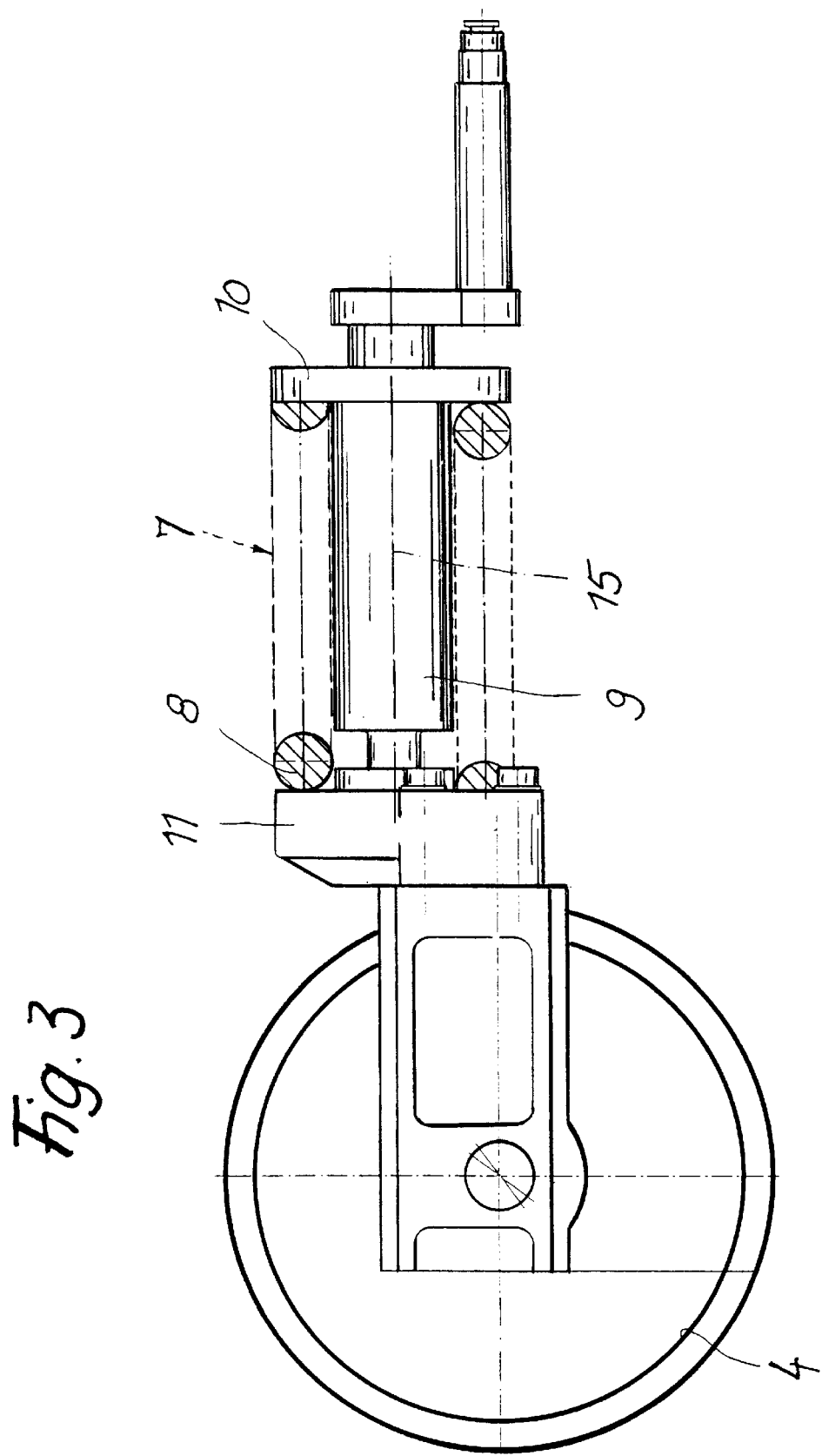

DRIVE ASSEMBLY FOR TRACK-LAYING VEHICLE

FIELD OF THE INVENTION

The present invention relates to a track-laying vehicle. More particularly this invention concerns a drive assembly for such a vehicle.

BACKGROUND OF THE INVENTION

A track-laying vehicle adapted to travel in a horizontal direction on the ground normally has on each side a drive assembly having in turn a horizontally elongated frame with two opposite ends and upper and lower edges extending parallel to the direction between the ends. A drive wheel is mounted at one of the ends, an idler wheel is mounted on a movable support at the other end, and a plurality of ground wheels are provided along the lower edge between the drive and idler wheels. An endless track looped around the wheels extends parallel to the direction along the idler wheels. A drive connected to the drive wheel displaces the track around the wheels. A spring unit is braced between the movable support and a support fixed on the frame and is set to allow the idler wheel to move perfectly parallel to the travel direction, which in turn is parallel to a centerline of the frame and of the track, so as to keep the track tight. Such a system is described in EP 0,052,310, DE 90 11 884, and WO 95/02,533.

With such a system as the track is pushed in, as for instance when one of the running wheels is deflected upward as the vehicle passes over a rock, the front idler wheel moves inward. In drives where the upper and lower stretches of the tracks are relatively close together, there is little room between these stretches, and much of that is occupied by the running wheels. Thus the axis of the spring unit is normally offset but parallel to the plane along which the idler wheel axis travels as it moves in and out.

The problem with this system is that it subjects the spring unit and in particular its guide structure to extreme wear because the entire assembly is twisted considerably as it is pushed in. Often the head at the end of the compression spring of the spring unit breaks off as a result of the angular force it is subjected to, requiring that expensive and difficult repairs be made.

OBJECTS OF THE INVENTION

It is therefore an object of the present invention to provide an improved drive assembly for a track-laying vehicle.

Another object is the provision of such an improved drive assembly for a track-laying vehicle which overcomes the above-given disadvantages, that is which is so constructed as to reduce the stress to the spring unit and its associated structure.

SUMMARY OF THE INVENTION

A drive assembly for a track-laying vehicle adapted to travel in a horizontal direction along the ground has according to the invention a horizontally elongated frame having two opposite ends and upper and lower edges extending parallel to the direction between the ends, a drive wheel at one of the ends, a support fixed on the frame between the ends, and a guide on the frame extending between the fixed support and the other end along a line forming an acute angle with the direction and extending downward toward the other end. A movable support displaceable parallel to the line in the guide carries an idler wheel at the other end. A spring braced between the supports urges the idler wheel parallel to the line away from the drive wheel. A plurality of ground wheels are mounted along the lower edge between the drive and idler wheels and an endless track looped around the wheels extends parallel to the direction along the idler wheels. A drive connected to the drive wheel rotates the drive wheel and displaces the track around the wheels.

The inclination of the line along which the idler wheel moves has the substantial advantage that the idler wheel when stressed can move upward which is advantageous from a friction point of view in that for example when running over an object on the ground or the like there are no forces parallel to the ground, but instead they are at an upward angle on the idler wheel. The idler wheel can therefore move relatively freely without subjecting its guide to excessive stress and without twisting the spring unit and its anchor. A further substantial advantage of this arrangement is that with low-profile drive assemblies the available space between the upper side of the frame or chassis of the assembly and the running wheels along the lower edge of the frame can be efficiently used in order to mount the spring unit in this space without interfering with the running wheels. It is important that the spring units not project past the upper edge of the frame since otherwise one would not have the desired low profile for the assembly.

According to the invention the angle is at most 10°. In addition the spring is centered on an axis offset from but parallel to the line although it is desirable to get the spring centerline as close as possible to the line.

BRIEF DESCRIPTION OF THE DRAWING

The above and other objects, features, and advantages will become more readily apparent from the following description, reference being made to the accompanying drawing in which:

FIG. 3 is a view of a subassembly of the structure of FIG. 2.

SPECIFIC DESCRIPTION

Figure 1:
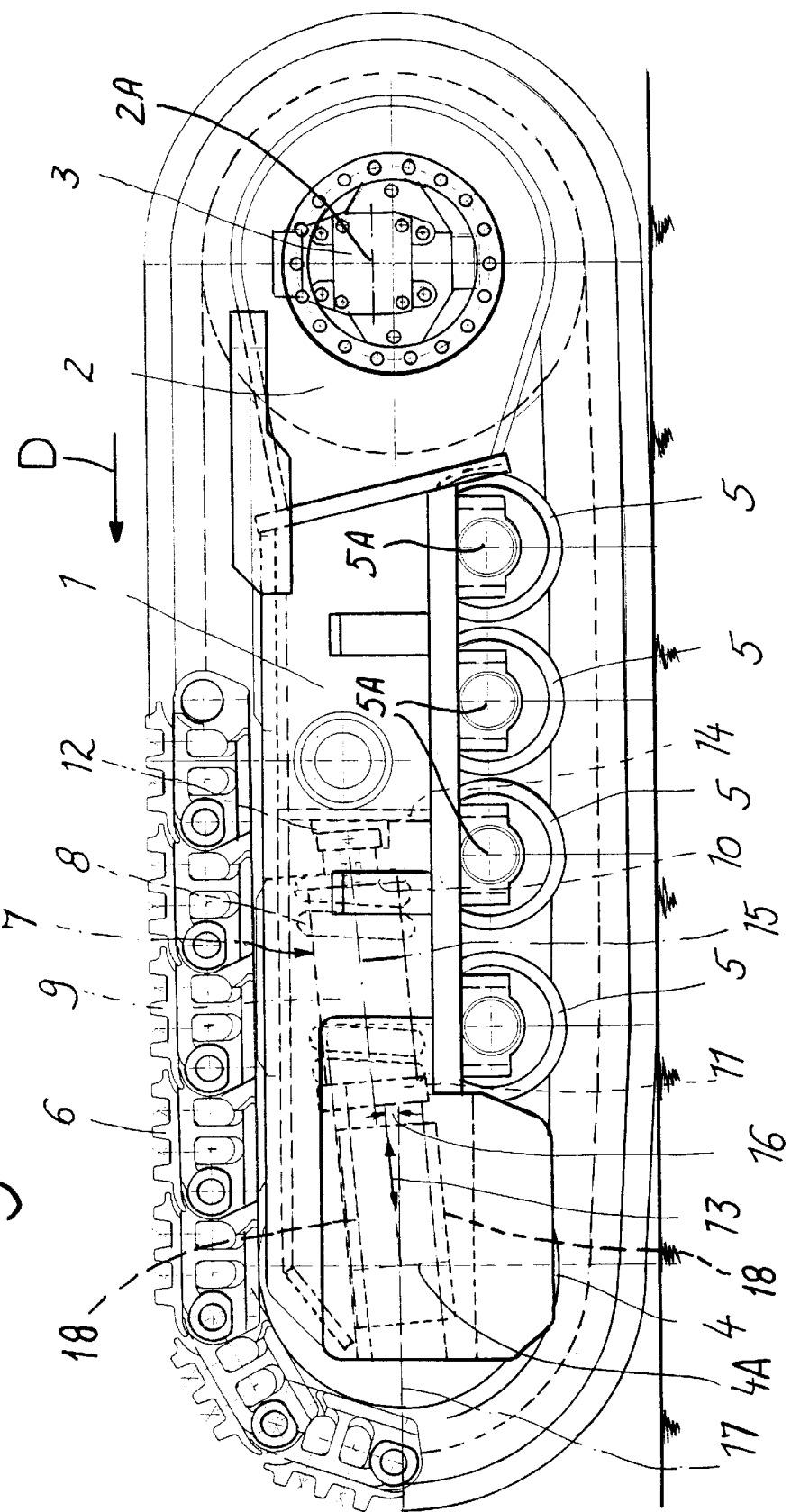
FIG. 1 is a partly sectional side view of a drive assembly according to the invention.
Figure 2:
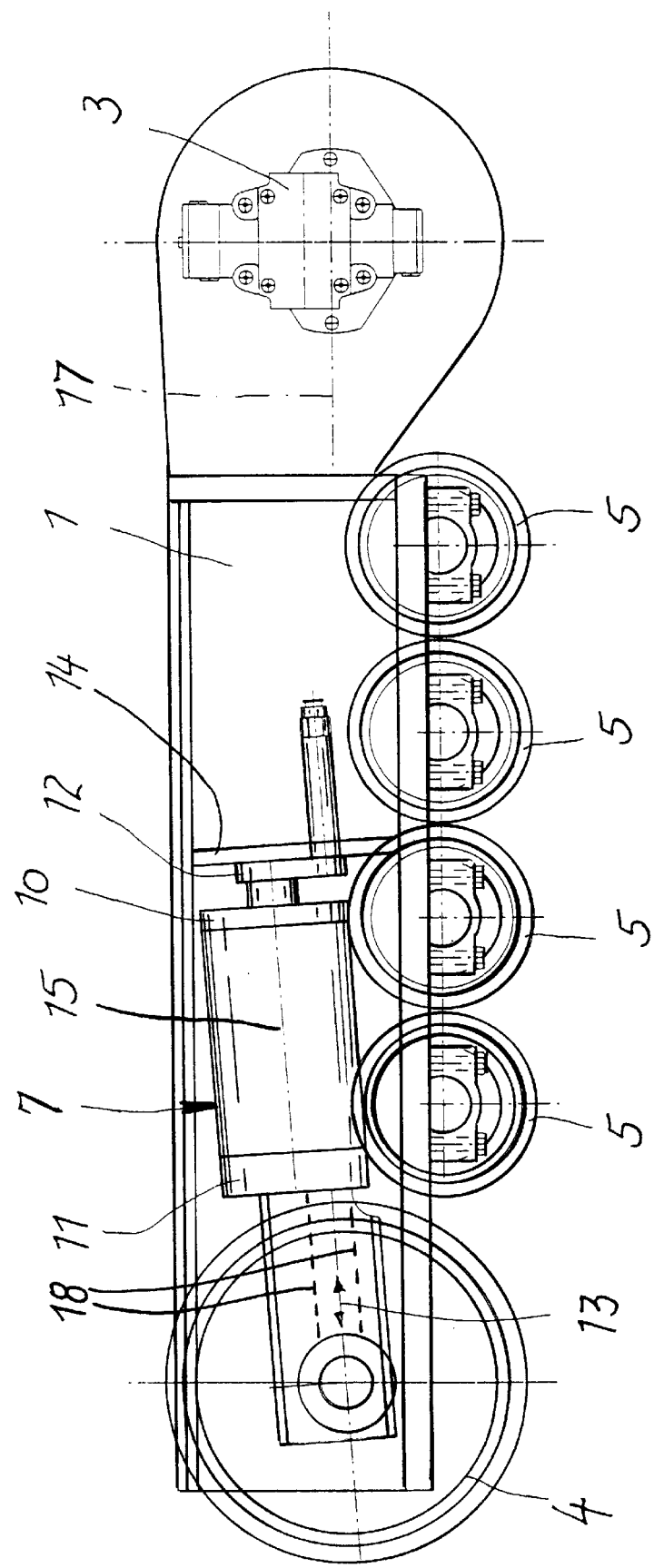
FIG. 2 is a view like FIG. 1 but with parts removed for clarity of view.

As seen in FIG. 1 a track-laying vehicle has on each side an elongated frame 1 centered on a horizontal axis 17 and adapted to travel in a direction D parallel to this axis 17. At its rear end the frame 1 carries a drive wheel 3 rotated about a horizontal axis 2A perpendicular to the axis 17 by motor 2 and at its front end an idler wheel 4 rotatable about a horizontal axis 4A that can intersect and extend perpendicular to the axis 17. Idler wheels 5 are carried between the wheels 2 and 4 on the bottom edge region of the frame 1 and rotate about parallel axes 5A lying in a horizontal plane parallel to and beneath the axis 17. A track 6 formed as an endless row of articulated sections is looped over the wheels 2, 4, and 5 and can be advanced to move the frame 1 in the direction D.

A spring unit 7 including a helical compression spring 8 (see FIG. 3) and a hydraulic unit 9 centered on an axis 15 are braced between an end plate 10 carried on a support 12 fixed in turn on a bracket 14 of the frame 1 and a support 11 formed as a fork on which the wheel 4 is mounted. Guides 18 engage unillustrated projecting guide elements of the support 11 to ensure travel of the support 11 along a straight line 13 forming an angle 16 of at most 10° with the axis 17. Thus as the support 11 and wheel 4 move out they move down and forward to a position with the axis 4A on the axis 17, and when they move in they move back and up.

The axis or line 13 is parallel to but offset from the axis 15 so as to allow the spring unit 7 to be mounted up out of the way of the idler wheels 5. In this way the entire drive assembly can be relatively short, measured vertically. If more space is available the offset between the axes 13 and 15 can be reduced or even eliminated altogether.

With this system the angled travel of the front idler wheel 4 substantially reduces stress to the parts 12 and 14 carrying the spring unit 7. Thus they will not be subjected to the considerable wear as in the prior-art systems where the axes 13 and 14 are parallel to and/or coincide with the axis 17.

We claim:

1. A drive assembly for a track-laying vehicle adapted to travel in a horizontal direction along the ground, the assembly comprising:

a horizontally elongated frame having two opposite ends and upper and lower edges extending parallel to the direction between the ends;

a drive wheel at one of the ends;

a support fixed on the frame between the ends;

a guide on the frame extending between the fixed support and the other end along a line forming an acute angle with the direction and extending downward toward the other end;

a movable support displaceable parallel to the line in the guide;

an idler wheel mounted on the movable support at the other end;

a spring braced between the supports and urging the idler wheel parallel to the line away from the drive wheel;

a plurality of ground wheels along the lower edge between the drive and idler wheels;

an endless track looped around the wheels and extending parallel to the direction along the idler wheels; and drive means connected to the drive wheel for rotating the drive wheel and displacing the track around the wheels.

2. The track-laying drive assembly defined in claim 1 wherein the angle is at most 10°.

3. The track-laying drive assembly defined in claim 1 wherein the spring is centered on an axis offset from but parallel to the line.

4. The track-laying drive assembly defined in claim 1 wherein the wheels all rotate about parallel axes.

\* \* \* \* \*